(12) United States Patent
Hong et al.

(10) Patent No.: US 11,897,546 B2
(45) Date of Patent: Feb. 13, 2024

(54) RETENTION ASSEMBLY FOR A DELIVERY VEHICLE

(71) Applicant: Ford Global Technologies, LLC, Dearborn, MI (US)

(72) Inventors: Young-Chae Hong, Dearborn, MI (US); Kurt Michael Lundeen, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 17/484,075

(22) Filed: Sep. 24, 2021

(65) Prior Publication Data

US 2023/0099160 A1    Mar. 30, 2023

(51) Int. Cl.
  B62D 33/04   (2006.01)
  B65G 1/137   (2006.01)
  B60P 3/00    (2006.01)

(52) U.S. Cl.
  CPC ............ B62D 33/046 (2013.01); B60P 3/007 (2013.01); B65G 1/137 (2013.01)

(58) Field of Classification Search
  CPC .. B60P 3/007; B60P 7/065; B60P 7/06; B60P 7/16; B60P 7/0807; B60P 7/10; B60P 7/0823; B60P 7/135; B62D 33/046; B62D 33/04; B65G 1/137
  USPC ........................ 294/24.4, 24.44, 37.6; 410/77
  See application file for complete search history.

(56) References Cited

U.S. PATENT DOCUMENTS

| | | | |
|---|---|---|---|
| 9,371,183 B2 | 6/2016 | Toebes et al. | |
| 9,850,079 B2 | 12/2017 | Cyrulik et al. | |
| 9,868,596 B2 | 1/2018 | Worsley et al. | |
| 9,884,719 B2 | 2/2018 | Pankratov et al. | |
| 9,950,862 B2 * | 4/2018 | Kadaba | B65G 67/24 |
| 10,239,691 B2 | 3/2019 | Lert et al. | |
| 10,315,805 B1 * | 6/2019 | Wilson | B65D 81/03 |
| 10,377,585 B2 | 8/2019 | Cyrulik et al. | |
| 10,543,942 B2 | 1/2020 | Almogy et al. | |
| 10,633,186 B2 | 4/2020 | Valinsky et al. | |
| 10,710,804 B2 | 7/2020 | Sullivan et al. | |
| 10,759,600 B2 | 9/2020 | Sullivan et al. | |
| 10,850,921 B2 | 12/2020 | Conrad et al. | |
| 10,894,663 B2 | 1/2021 | Kapust et al. | |

(Continued)

FOREIGN PATENT DOCUMENTS

CN    105460844 B  * 12/2018
CN    208777786 U    4/2019

(Continued)

OTHER PUBLICATIONS

Machine translation of CN-105460844-B (Year: 2018).*

*Primary Examiner* — Lori Lyjak
(74) *Attorney, Agent, or Firm* — Vichit Chea; Price Heneveld LLP (57) ABSTRACT

A delivery system for delivery items includes sidewalls that define a cargo space. A retention assembly is operably coupled to the sidewalls. The retention assembly includes a housing and a retention feature that is operably coupled to the housing. The retention feature has an attachment portion and a control unit that is operably coupled with the retention feature. A controller is communicatively coupled to the control unit of the retention assembly, and a memory storage is communicatively coupled with the controller.

13 Claims, 9 Drawing Sheets

(56) References Cited

U.S. PATENT DOCUMENTS

| | | | | |
|---|---|---|---|---|
| 2005/0163581 A1* | 7/2005 | Schnoor | ............... | B60P 7/135 |
| | | | | 410/77 |
| 2014/0255122 A1* | 9/2014 | Radosevic | ........... | G05D 16/163 |
| | | | | 137/225 |
| 2016/0224930 A1* | 8/2016 | Kadaba | .................. | B65G 1/16 |
| 2017/0357919 A1* | 12/2017 | Bischoff | ................ | B07C 3/08 |
| 2018/0079349 A1* | 3/2018 | Benitez | ................. | F16B 5/121 |
| 2019/0143872 A1* | 5/2019 | Gil | ..................... | B60P 1/4471 |
| | | | | 211/86.01 |
| 2019/0213541 A1* | 7/2019 | Dautz | ................. | B65G 67/04 |
| 2020/0339351 A1 | 10/2020 | Sullivan et al. | | |
| 2021/0147146 A1 | 5/2021 | Conrad et al. | | |
| 2022/0396192 A1* | 12/2022 | Paul | ................. | G06Q 10/0835 |

FOREIGN PATENT DOCUMENTS

| | | | | | |
|---|---|---|---|---|---|
| DE | 4216709 | A1 | | 11/1992 | |
| DE | 19834927 | B4 | * | 1/2007 | ........... B65G 1/0435 |
| EP | 3623324 | A1 | * | 3/2020 | .......... B25J 15/0014 |
| JP | 2018502027 | A | | 1/2018 | |
| JP | 2019189461 | A | | 10/2019 | |

* cited by examiner

RETENTION ASSEMBLY FOR A DELIVERY VEHICLE

FIELD OF THE DISCLOSURE

The present disclosure generally relates to a delivery vehicle. More particularly, the present disclosure generally relates to a retention assembly for a delivery vehicle.

BACKGROUND OF THE DISCLOSURE

Delivery vehicles typically store items for delivery on shelves. The driver generally retrieves the items for delivery at various locations. The driver may retrieve the items by entering the rear of the delivery vehicle and the items may shift during transit.

SUMMARY OF THE DISCLOSURE

According to a first aspect of the present disclosure, a delivery vehicle includes sidewalls within a cargo space. Shelving units are operably coupled to the sidewalls and configured to receive a delivery item, and a retention assembly is coupled to the sidewalls proximate to the shelving units. The retention assembly includes a housing that is coupled to the sidewalls and a retention feature that is operably coupled to the housing. The retention feature includes a retractable body and an attachment portion. The retention assembly further includes a control unit that is communicatively coupled to the retention assembly and configured to activate the retention assembly.

Embodiments of the first aspect of the disclosure can include any one or a combination of the following features:
- a vacuum assembly is disposed within the housing and is operably coupled to the retention feature;
- the vacuum assembly is communicatively coupled with the control unit;
- the control unit is configured to activate the vacuum assembly to retain adjacent delivery items relative the delivery item that is disposed on at least one of the shelving units;
- a sensor is proximate the retention feature;
- the sensor is configured to detect a position of the delivery item;
- the control unit is configured to receive a signal from the sensor;
- the control unit is configured to activate the retractable body and the vacuum assembly upon receiving the signal from the sensor;
- a lift assembly is operably coupled to the shelving units and includes a control unit;
- the control unit of the lift assembly is communicatively coupled to the control unit of the retention assembly via a wireless communication interface;
- the control unit of the lift assembly is configured to activate the lift assembly to retrieve the delivery item; and/or
- the control unit of the retention assembly is configured to activate the retention assembly to retain adjacent delivery items on the shelving units.

According to a second aspect of the present disclosure, a retention assembly for a delivery vehicle includes a housing that is coupled to sidewalls of the delivery vehicle. A retention feature is operably coupled to the housing. The retention feature includes a retractable body and an attachment portion. A vacuum assembly is operably coupled to the retention feature. A control unit is operably coupled to the retention feature and the vacuum assembly.

Embodiments of the second aspect of the disclosure can include any one or a combination of the following features:
- the attachment portion defines an aperture;
- the vacuum assembly defines an at least partial vacuum at the aperture defined by the attachment portion;
- the retractable body is operable between an extended condition and a retracted condition;
- a sensor is proximate the retention feature and is communicatively coupled with the control unit; and/or
- the control unit is configured to activate the vacuum assembly to retain at least one delivery item via the retention feature.

According to a third aspect of the present disclosure, a delivery system for delivery items includes sidewalls that define a cargo space. A retention assembly is operably coupled to the sidewalls. The retention assembly includes a housing and a retention feature that is operably coupled to the housing. The retention feature has an attachment portion and a control unit that is operably coupled with the retention feature. A controller is communicatively coupled to the control unit of the retention assembly, and a memory storage is communicatively coupled with the controller.

Embodiments of the third aspect of the disclosure can include any one or a combination of the following features:
- the memory storage is configured with an offline training routine;
- a sensor system is proximate the retention assembly and is communicatively coupled with the controller;
- the sensor system includes at least one of a proximity sensor and an imager;
- the sensor system is configured to detect a position of a delivery item and is configured to communicate with the controller the detected position;
- the control unit of the retention assembly is configured to activate the retention assembly based on the detected position received from the sensor system;
- the controller is configured to receive delivery data from a wireless communication interface;
- the delivery data includes at least one of weather data and road data;
- a lift assembly is operably coupled to the controller and is cooperatively operable with the retention assembly; and/or
- a vacuum assembly is operably coupled to the retention feature and is communicatively coupled with the control unit to selectively define an at least partial vacuum at the attachment portion of the retention feature.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
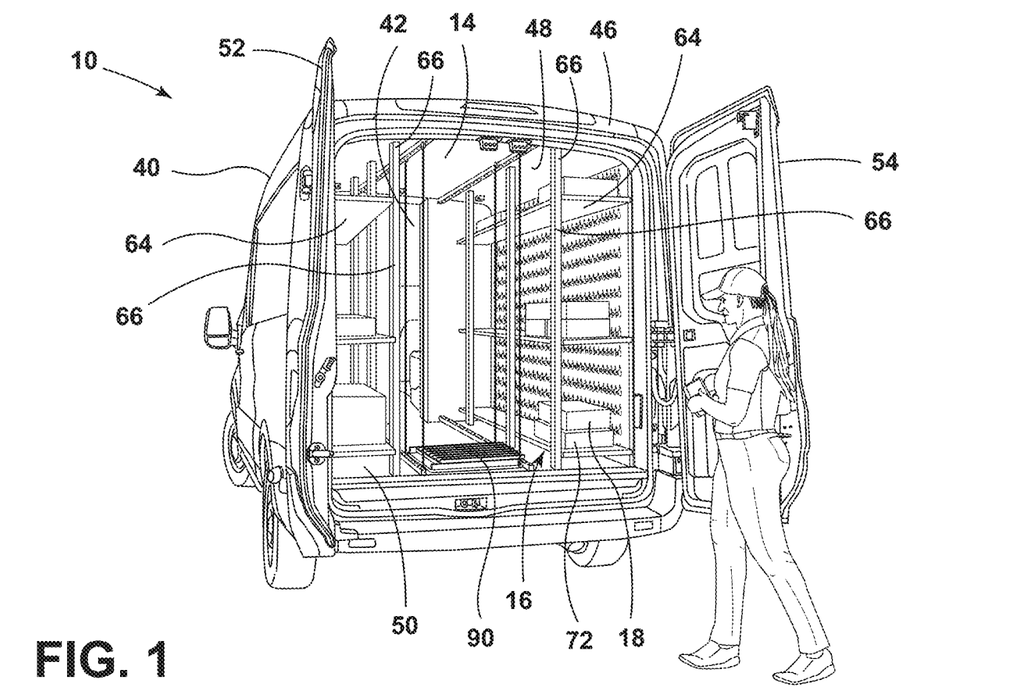
FIG. 1 is a rear perspective view of a delivery vehicle of the present disclosure.
Figure 2:
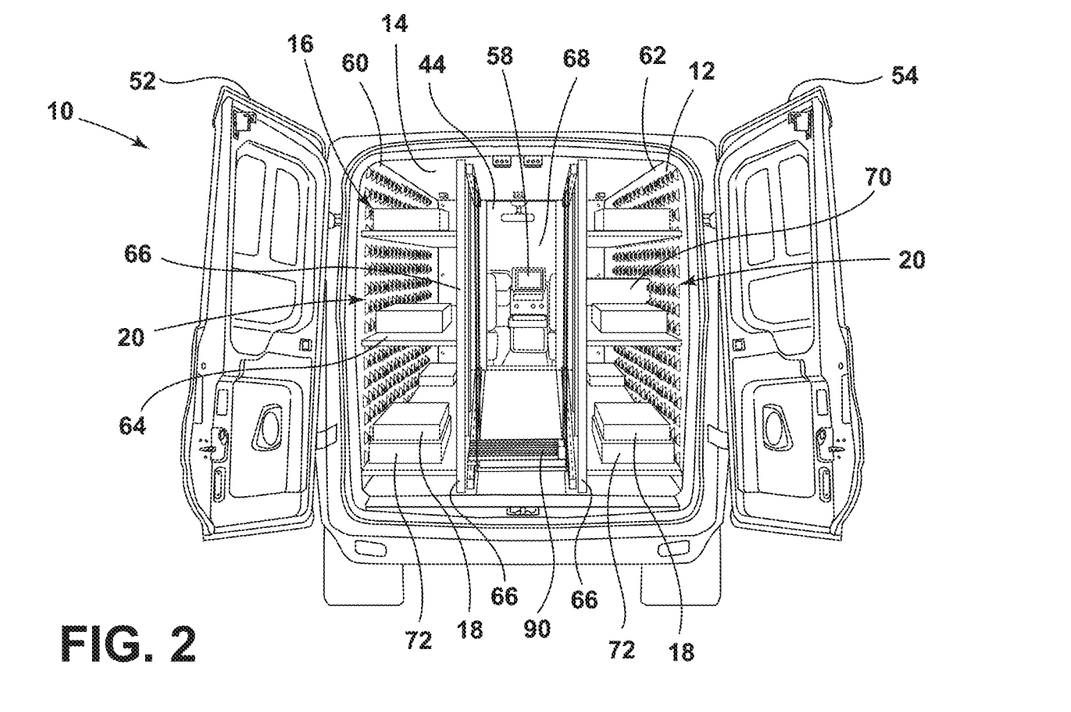
FIG. 2 is a rear elevational view of the delivery vehicle of FIG. 1.
Figure 3:
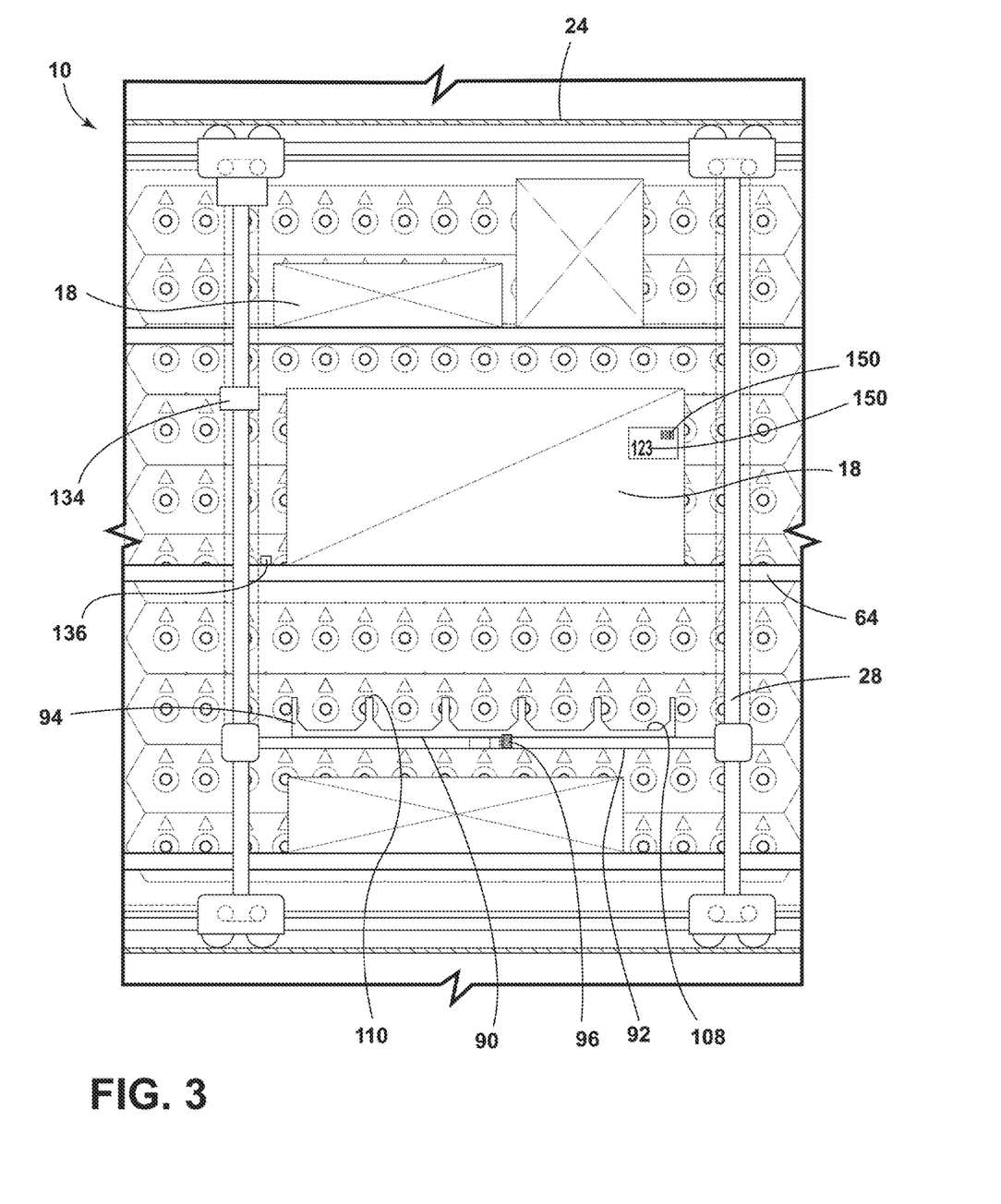
FIG. 3 is an enlarged partial side perspective view of a lift assembly and retention assembly of the present disclosure.
Figure 4:
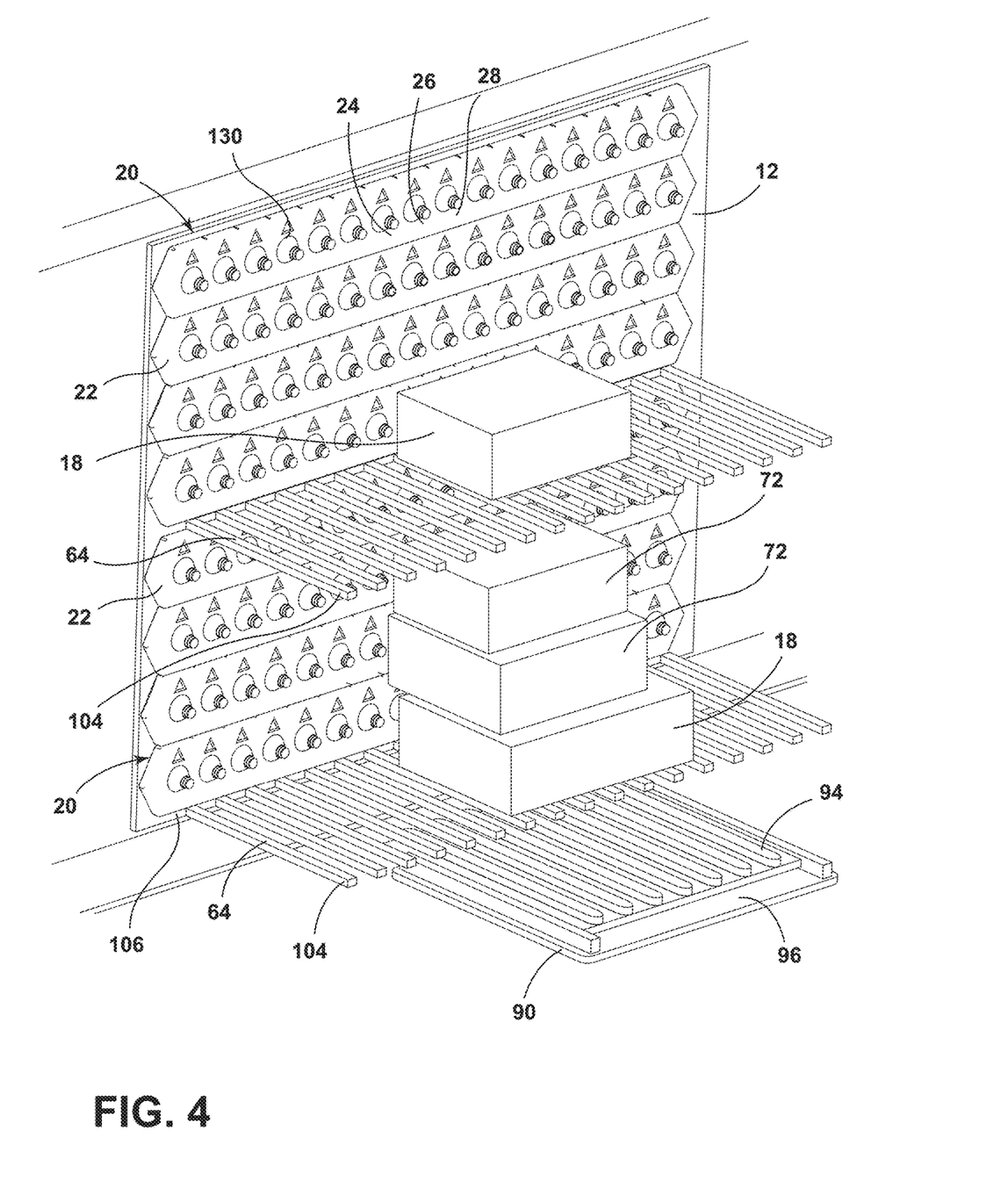
FIG. 4 is an enlarged partial top perspective view of a retention assembly of the present disclosure and with delivery items positioned on shelves.
Figure 5:
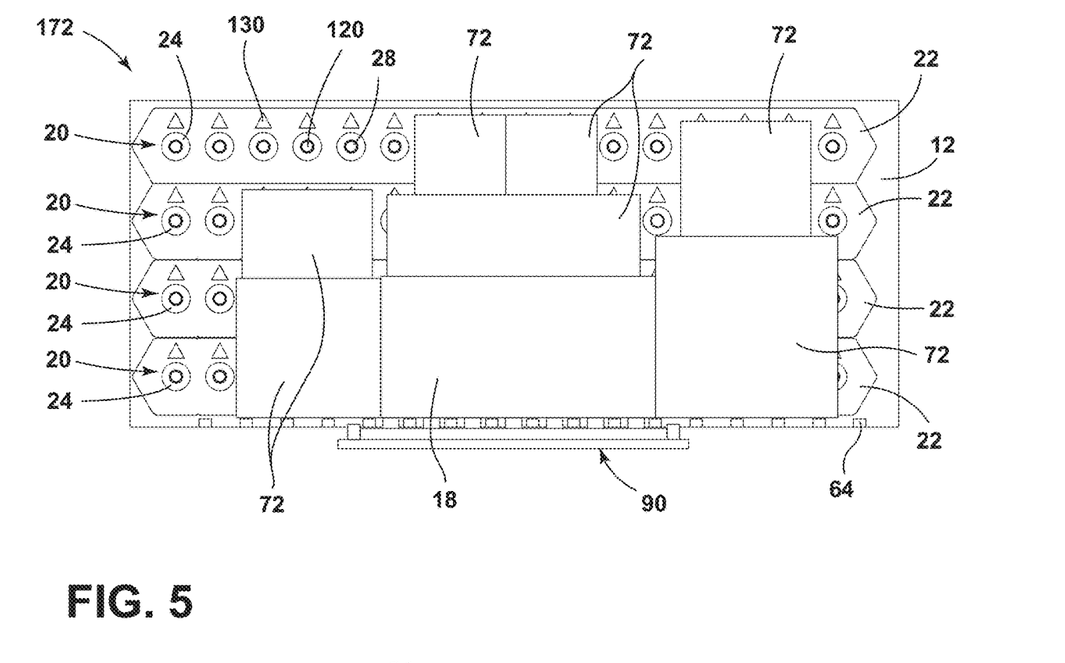
FIG. 5 is a partial elevational view of a cargo space of a delivery vehicle with delivery items on shelves proximate to retention assemblies of the present disclosure.
Figure 6:
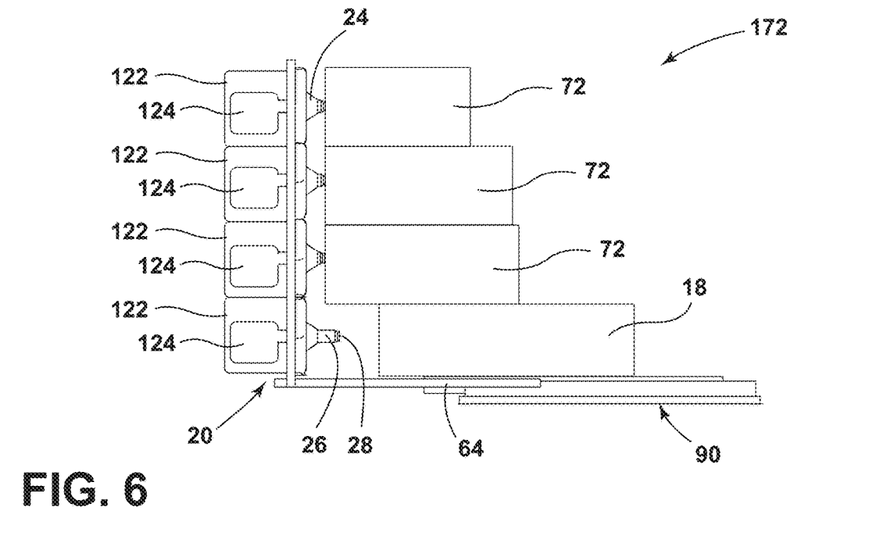
FIG. 6 is a partial side elevational view of a cargo space of a delivery vehicle with delivery items on shelves proximate to retention assemblies of the present disclosure with one delivery item being removed by a lift assembly of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11, reference number 10 generally refers to a delivery vehicle that includes sidewalls 12 within a cargo space 14. Shelving units 16 are operably coupled to the sidewalls 12 and configured to receive a delivery item 18. A retention assembly 20 is coupled to the sidewalls 12 proximate to the shelving units 16. The retention assembly 20 includes a housing 22 coupled to the sidewalls 12 and a retention feature 24 operably coupled to the housing 22. The retention feature 24 includes a retractable body 26 and an attachment portion 28. A control unit 30 is communicatively coupled to the retention assembly 20 and is configured to activate the retention assembly 20.

Referring to FIGS. 1-4, the delivery vehicle 10 includes a vehicle body 40 that defines an interior 42 of the delivery vehicle 10. The interior 42 of the delivery vehicle 10 is generally divided between a passenger compartment 44 and the cargo space 14, such that the cargo space 14 is defined toward a rear portion 46 of the delivery vehicle 10. The interior 42 of the delivery vehicle 10 is further defined by a ceiling 48 and a floor 50, in addition to the sidewalls 12. The cargo space 14 may be accessible from the passenger compartment 44 via a door and/or an opening. The cargo space 14 may also be accessible via first and second doors 52, 54 coupled to the rear portion 46 of the delivery vehicle 10. The first and second doors 52, 54 provide selective access to the cargo space 14. The cargo space 14 is described in more detail below. The passenger compartment 44 may include a remote user device 58 with which a driver may interact and receive delivery information, as described further below.

In various examples, the delivery vehicle 10 is a wheeled motor vehicle 10, which may be a sedan, a sport utility vehicle, a truck, a van, a crossover, and/or other styles of vehicle. The delivery vehicle 10 may be a manually operated vehicle (e.g., with a human driver), a fully autonomous vehicle (e.g., no human driver), or a partially autonomous vehicle (e.g., may be operated with or without a human driver).

With further reference to FIGS. 1-4, the cargo space 14 may be divided into first and second sides 60, 62, and the shelving units 16 may be disposed along each of the first and second sides 60, 62. The shelving units 16 are generally configured as multilayer shelves 64 operably coupled to vertical supports 66 and extending between the ceiling 48 and the floor 50 of the delivery vehicle 10. The vertical supports 66 may be disposed along the sidewalls 12 of the cargo space 14 and/or may be disposed proximate to a central portion 68 of the cargo space 14. The shelves 64 may be open shelving, such that the shelves 64 extend along a length of the cargo space 14 may generally be free from obstructions and/or barriers along a length of the shelves 64. Additionally or alternatively, some or all of the shelves 64 may define separate storage compartments 70 in which the delivery item 18 may be disposed.

By way of example, not limitation, the delivery item 18 may be a package or other parcel used to protect and conceal a user item during delivery. It is also contemplated that adjacent delivery items 72 may be disposed along the shelves 64 proximate to the delivery item 18. The delivery item 18 refers to a target delivery item that is to be removed from the shelving unit 16 for delivery.

Referring still to FIGS. 1-4, the delivery vehicle 10 also includes a lift assembly 90 that has a platform 92 and a central receiving member 94. It is also contemplated that a motor assembly 96 may be operably coupled with the lift assembly 90 to translate the lift assembly 90 within the cargo space 14. The lift assembly 90 may also include a control unit 98 configured with a processor 100 and communication circuitry 102, described below. As also described in more detail below, the lift assembly 90 can remove the identified the delivery item 18 and remove, at least, the delivery item 18 from the shelf 64 via the central receiving member 94. The shelves 64 are formed from a plurality of rods 104 extending outwardly from a support portion 106 to define each shelf 64. Additionally or alternatively, the plurality of rods 104 may outwardly extend from the sidewalls 12 of the delivery vehicle 10 proximate the retention assembly 20.

As described in more detail below, the motor assembly 96 is configured to translate the lift assembly 90 within the cargo space 14 to remove the delivery item 18 from the respective shelf 64. The motor assembly 96 is communicatively and operably coupled to the control unit 98 to activate and generally translate the lift assembly 90 within the cargo space 14 proximate the shelving units 16. The motor assembly 96 is also operably coupled with the central receiving member 94 of the lift assembly 90 to translate the central receiving member 94 toward the shelving units 16 to retrieve the delivery item 18. Stated differently, the central receiving member 94 is operable between a retrieval position and a holding position. The motor assembly 96 can translate the central receiving member 94 to the retrieval position to remove the delivery item 18 from the respective shelf 64, as described further below. The central receiving member 94 defines a plurality of grooves 108 that selectively receive the rods 104 of the shelves 64 in the retrieval position. Support ridges 110 separate and define each of the grooves 108 and are configured to receive and support the delivery item 18 in both the retrieval position and the holding position, respectively.

With reference now to FIGS. 4-7, the retention assembly 20 is defined along the sidewalls 12 of the delivery vehicle 10 in a grid pattern, such that the sidewalls 12 of the delivery vehicle 10 are substantially covered with the retention assembly 20. Additionally or alternatively, a plurality of retention assemblies 20 may be intermittently disposed along the sidewalls 12 of the delivery vehicle 10. As mentioned above, the retention assembly 20 includes the housing 22 and the retention feature 24. It is generally contemplated that a plurality of retention features 24 are disposed along the housing 22 to form the retention assembly 20. Each retention feature 24 includes the attachment portion 28, which may define an aperture 120. The attachment portion 28 of each of the retention features 24 is configured to engage the delivery item 18 as well as the adjacent delivery items 72.

As described in more detail below, the attachment portion 28 is operably coupled to the retractable body 26, such that the retractable body 26 can translate the attachment portion 28 to engage the delivery item 18 and/or the adjacent delivery items 72. It is generally contemplated that the retractable body 26 is operable between an extended condition and a retracted condition. The retractable body 26 is configured to extend a predetermined distance D from the housing 22. It is generally contemplated that the lift assembly 90 may assist in repositioning of the delivery item 18 and/or the adjacent delivery items 72 if the delivery item 18 and/or the adjacent delivery items 72 are positioned on the shelf 64 at a distance greater than the predetermined distance D, as described further below.

With reference now to FIGS. 5-10, the retention assembly 20 may also include a vacuum assembly 122 operably coupled to the housing 22 and each of the retention features 24. The vacuum assembly 122 may include, at least, a vacuum pump 124 configured to define an at least partial vacuum at the aperture 120 of the retention feature 24. The vacuum assembly 122 is operably coupled with the control unit 30, such that the control unit 30 may activate and deactivate the vacuum pump 124 to selectively define the at least partial vacuum between the attachment portion 28 of the retention feature 24 and the delivery item 18 and/or the adjacent delivery items 72. By way of example, not limitation, the control unit 30 may activate the vacuum pump 124 of the retention features 24 proximate the adjacent delivery items 72 and may simultaneously deactivate the vacuum pump 124 of the retention feature(s) 24 proximate to the delivery item 18, as described in more detail below. Stated differently, the control unit 30 may activate the vacuum pump 124 to selectively retain the adjacent delivery items 72 while releasing the delivery item 18 in preparation for removal.

The retention assembly 20 may also include a proximity sensor 130 positioned proximate to at least one of the retention features 24 on the housing 22. The proximity sensor 130 may be configured to detect the position of the delivery items 18, 72 relative to the retention assembly 20. While the proximity sensor 130 is described in relation to the retention assembly 20, it is generally contemplated that the proximity sensor 130 may be incorporated within a sensor system 132, which is operably coupled to the control unit 30 and the retention assembly 20 as described below. The proximity sensor 130 may be wired with the retention assembly 20 and/or may be wirelessly coupled with the control unit 30 of the retention assembly 20. The proximity sensor 130 may be configured to detect a position of the delivery item 18 and/or the adjacent delivery items 72 relative to the retention assembly 20. For example, the proximity sensor 130 may detect whether the delivery item 18 is within the predetermined distance D of the retractable body 26. The proximity sensor 130 can then send a signal to the control unit 30 corresponding to the detected position of the delivery item 18, as described in more detail below.

Referring still to FIGS. 5-10, the delivery vehicle 10 may include the sensor system 132 that is communicatively coupled with the proximity sensor 130 and the control unit 30. The sensor system 132 may include the proximity sensor 130, an imager 134, a motion sensor 136, a road condition sensor 138, a rain sensor 140, and/or a light sensor 142. It is also contemplated that the sensor system 132 includes a control unit 144 configured with routines executed via a processor 146 and communication circuitry 148 that is configured to communicate with the control unit 30 of the retention assembly 20. It is generally contemplated that the imager 134 and the motion sensor 136 are generally positioned proximate to the central portion 68 of the cargo space 14, and the proximity sensor 130 is positioned proximate to the retention features 24. The imager 134 may be configured to detect image data 150 in the form of the delivery item 18 and/or the adjacent delivery items 72. The imager 134 can communicate the detected image data 150, including, but not limited to, the position of the delivery item 18 and/or the adjacent delivery items 72 on the shelving units 16. It is also contemplated that the delivery item 18 and the adjacent delivery items 72 may each include a label, and the image data 150 detected may include, but is not limited to, delivery information of the delivery item 18. The sensor system 132 is described in more detail below in relation to the operation of the retention assembly 20 and the lift assembly 90 via the control unit 30.

The control unit 30 of the retention assembly 20 includes a memory storage 160 in which the predetermined distance D and routines 162 of the retention assembly 20 may be stored. The control unit 30 may also be configured with a processor 164 and other control circuitry. The processor 164 is configured to execute the routines 162 stored in the memory storage 160 based on the data and/or communications received by the control unit 30. The other control circuitry of the control unit 30 may include communication circuitry 166 for bidirectional communication. For example, the control unit 30 may be communicatively coupled with a wireless communication interface 168, described below, via the communication circuitry 166. While the memory storage 160 can be included within the control unit 30, cloud storage or other remotely accessible memory interfaces can also be used instead of or in combination with the memory storage 160. The control unit 30 may be onboard the retention assembly 20, such that each retention assembly 20 is configured with the control unit 30. Additionally or alternatively, the control unit 30 may be separately disposed within the delivery vehicle 10 and communicatively coupled with each of the retention assemblies 20.

The communication interface 168 may be implemented via one or more direct or indirect nonhierarchical communication protocols, including but not limited to, Bluetooth®, Bluetooth® low energy (BLE), Thread, Ultra-Wideband, Z-wave, ZigBee, etc. Additionally, the communication interface 168 may correspond to a centralized or hierarchal communication interface 168 where one or more of the devices communicate via the wireless router (e.g., a communication routing controller). Accordingly, the communication interface 168 may be implemented by a variety of communication protocols, including, but not limited to, global system for mobile communication (GSM), general packet radio services, code division multiple access, enhanced data GSM environment, fourth-generation (4G) wireless, fifth-generation (5G) wireless, Wi-Fi, world interoperability for wired microwave access (WiMAX), local area network, Ethernet, etc. By flexibly implementing the communication interface 168, the various devices and servers may be in communication with one another directly via the wireless communication interface 168 or a cellular data connection.

Each of the controller and the control units disclosed herein may include various types of control circuitry, digital or analog, and may each include a processor, a microcontroller, an application specific integrated circuit (ASIC), or other circuitry configured to perform the various inputs or outputs, control, analysis, or other functions described herein. The memories described herein may be implemented in a variety of volatile and nonvolatile memory formats. Routines may include operating instructions to enable the various methods described herein.

With further reference to FIGS. 5-10, it is also contemplated that the delivery vehicle 10 includes a controller 170 that may be communicatively coupled with the control unit 30 of the retention assembly 20, the control unit 98 of the lift assembly 90, and/or the control unit 144 of the sensor system 132 and is described in more detail below. The controller 170 is configured as part of a delivery system 172 and includes a processor 174, a memory 176, and communication circuitry 178. Instructions or routines 180 are stored in the memory 176 and executable by the processor 174. The delivery system 172 includes the sensor system 132, the retention assembly 20, the lift assembly 90, in addition to the controller 170. It is generally contemplated that the delivery system 172 is operable over the wireless communication interface 168 via the controller 170 and each of the control units 30, 98, 144 of the retention assembly 20, the lift assembly 90, and the sensor system 132, respectively. It is also contemplated that the controller 170 of the delivery system 172 is communicatively coupled with the retention assembly 20, the lift assembly 90, and the sensor system 132 via the wireless communication interface 168, which may include a network. The controller 170 may receive delivery data from the communication interface 168, including, but not limited to, weather data and road data. The weather data may be communicated with the controller 170 via the communication interface 168 from a weather system 184. The weather system 184 may include, but is not limited to, a weather servicing station that provides wireless communication regarding detected weather patterns, such as an application, server, and/or wireless software. It is generally contemplated that the weather data may correspond to current and predicted weather patterns within a delivery area of the delivery vehicle 10.

By way of example, not limitation, the controller 170 may receive the weather data via the communication interface 168, indicating the delivery vehicle 10 may encounter weather conditions such as, for example, rain, snow, and/or sleet. It is also contemplated that the controller 170 may receive the weather data from the sensor system 132 via at least one of the rain sensor 140, road condition sensor 138, and/or the light sensor 142. The controller 170 may activate the control unit 30 of the retention assembly 20 to retain the delivery items 18, 72 in response to the weather data. For example, the control unit 30 may activate the vacuum pump 124 to define the at least partial vacuum between the attachment portion 28 of the retention features 24 and the delivery items 18, 72 to secure the delivery items 18, 72 relative the shelving units 16.

The controller 170 may also receive the road data from the sensor system 132 via at least one of the motion sensor 136 and the road condition sensor 138. For example, the controller 170 may receive the road data from the road condition sensor 138 indicating the road conditions are irregular or otherwise bumpy. The controller 170 may adjust the retention assembly 20 via the control unit 30 in response to the road data received from the sensor system 132. The operation and control of the retention assembly 20 via the control unit 30 and the controller 170 is described in more detail below with respect to the delivery system 172.

Referring again to FIGS. 1-11 and in operation, the delivery system 172 activates and controls the retention assembly 20 and the lift assembly 90 within the delivery vehicle 10. The controller 170 of the delivery system 172 communicates with the control unit 30 of the retention assembly 20 to activate and/or deactivate the retention features 24 relative to the delivery item 18 and/or the adjacent delivery items 72. For example, the controller 170 may receive the delivery data from the communication interface 168, which may indicate a road condition that may alter and/or adjust the position of the delivery item 18 and/or the adjacent delivery items 72. The controller 170 may activate the control unit 30 of the retention assembly 20 to generally retain the delivery item 18 and the adjacent delivery items 72 on the shelving units 16. The control unit 30 may activate the vacuum assembly 122 to retain the delivery item 18 and/or the adjacent delivery items 72 along the shelving units 16 during transport and movement of the delivery vehicle 10 in response to the communication received from the controller 170. It is generally contemplated that the effect of the road conditions and/or weather conditions may be minimized relative to the delivery items 18 and adjacent delivery items 72 via activation of the vacuum assembly 122 of the retention assembly 20. For example, the controller 170 may receive the delivery data from the communication interface 168 and can cooperate with the control units 30, 98 of the retention assembly 20 and the lift assembly 90, respectively, to maintain the position of the delivery items 18, 72 along the shelving units 16.

The control unit 30 may activate the vacuum pump 124 to define the at least partial vacuum at the aperture 120 of each retention feature 24 to engage the attachment portion 28 of the retention feature 24 with the delivery items 18, 72. It is generally contemplated that the attachment portion 28 of the retention features 24 may be generally flexible and/or pliable, such that the application of the at least partial vacuum on the delivery items 18, 72 may bend or otherwise flex the attachment portion 28. Stated differently, the attachment portion 28 may suction to the delivery items 18, 72 upon application of the at least partial vacuum at the aperture 120. It is also contemplated that the at least partial vacuum may be defined at the apertures 120 of the retention features 24 proximate to the adjacent delivery items 72, while the vacuum assembly 122 may be deactivated via the control unit 30 proximate to the delivery item 18. For example, the driver of the delivery vehicle 10 may input the delivery location into the remote user device 58, and the imager 134 may detect the corresponding label. Upon detection of the image data 150, the control unit 144 of the sensor system 132 may communicate with the control unit 30 to activate and/or deactivate the retention assembly 20 relative to the delivery item 18 with the corresponding label. The sensor system 132 is communicatively coupled with the retention assembly 20 and the lift assembly 90 within the delivery system 172 via the wireless communication interface 168.

Referring still to FIGS. 1-11 and in operation, the controller 170 may communicate the delivery data with each control unit 30, 98, 144 in preparation of delivery of the delivery item 18. As mentioned above, the sensor system 132 can be utilized to identify the respective delivery item 18 via the imager 134, and the lift assembly 90 may be utilized to retrieve the delivery item 18. The retention assembly 20 may also assist by repositioning the delivery item 18 along the shelf 64. By way of example, and not limitation, the control unit 30 of the retention assembly 20 may activate the retractable body 26 to extend the retention feature 24 toward the delivery item 18 and at least partially articulate the delivery item 18 along the shelf 64. The controller 170 may then activate the lift assembly 90 to translate the lift assembly 90 toward the delivery item 18. The control unit 98 of the lift assembly 90 can activate the motor assembly 96 to extend the central receiving member 94 toward the shelving unit 16 with the delivery item 18 to retrieve the delivery item 18 from the shelf 64. The central receiving member 94 is translated beneath the shelf 64 via the motor assembly 96, and the lift assembly 90 is raised, such that the delivery item 18 is placed on the central receiving member 94 and removed from the shelf 64.

The motor assembly 96 may then translate the central receiving member 94 away from the shelf 64 toward the central portion 68 of the delivery vehicle 10. The adjacent delivery items 72 may be retained by the retention features 24 via the at least partial vacuum defined by the vacuum assembly 122. The engagement of the retention features 24 with the adjacent delivery items 72 minimizes the overall shifting and adjustment of the adjacent delivery items 72 during removal of the delivery item 18 by the lift assembly 90. It is also contemplated that the delivery item 18 may be positioned beneath at least one of the adjacent delivery items 72, such that the retention features 24 may retain the adjacent delivery items 72, while the delivery item 18 is removed from the shelf 64 from beneath the adjacent delivery item 72. The proximity sensor 130 may detect and communicate the removal of the delivery item 18 with the control unit 30.

It is generally contemplated that the retention assembly 20 may retain the adjacent delivery items 72 while the delivery item 18 is removed from the shelf 64 and the lift assembly 90, respectively. The control unit 30 may communicate with the control unit 98 of the lift assembly 90 to assist in repositioning the adjacent delivery items 72 along the shelf 64. The control unit 30 may articulate the retention features 24 to gradually translate the adjacent delivery items 72 on to the shelf 64 after removal of the delivery item 18. For example, the control unit 30 may selectively activate a portion of the retention assembly 20 to slowly transition the adjacent delivery items 72 toward the shelf 64. The lift assembly 90 may also be utilized to guide or otherwise adjust the adjacent delivery items 72 after removal of the delivery item 18.

Figure 7:
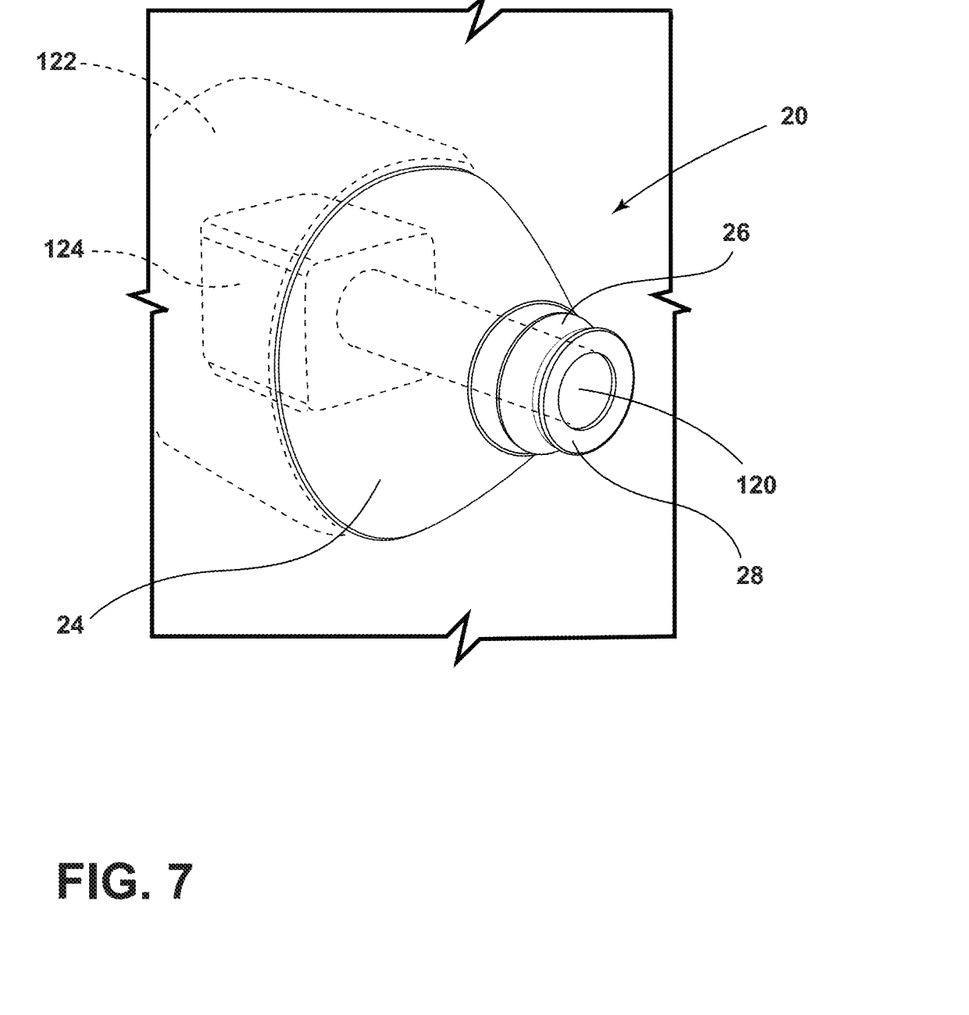
FIG. 7 is an enlarged partial side perspective view of a retention assembly of the present disclosure with a retractable body in a retracted condition.
Figure 8:
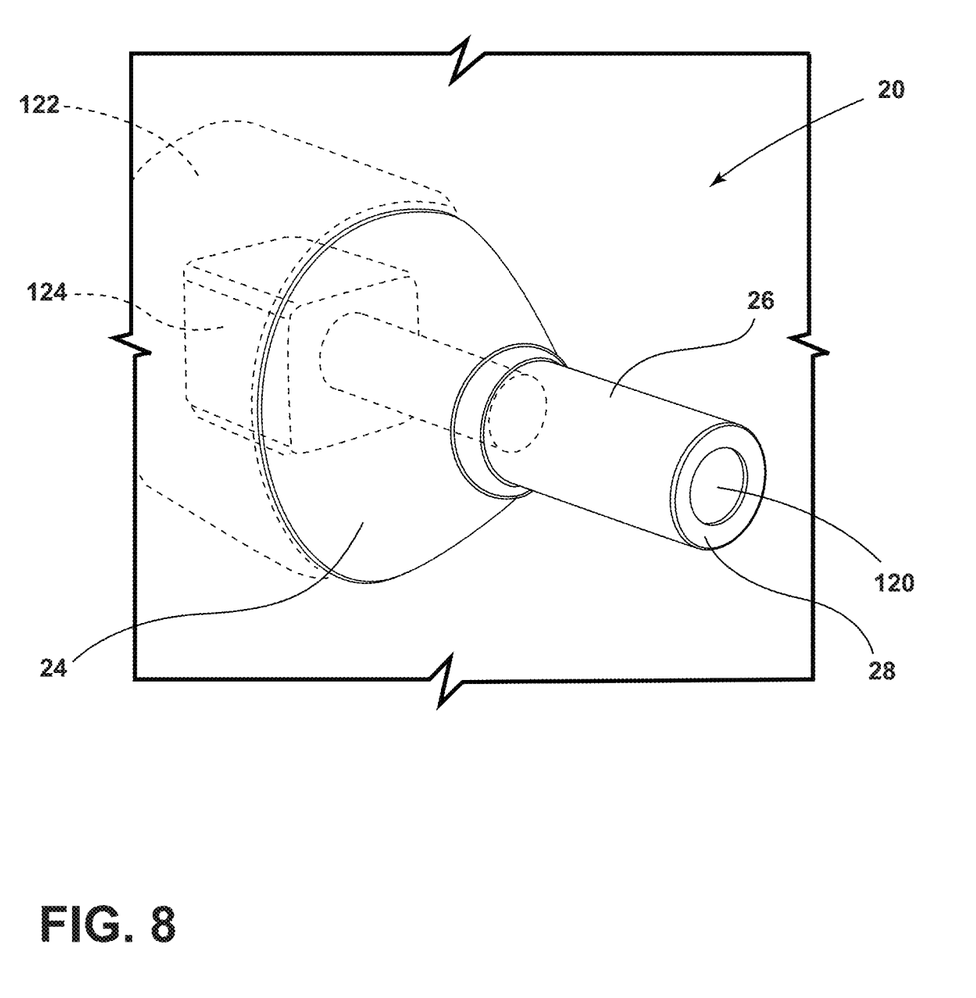
FIG. 8 is an enlarged partial side perspective view of the retention assembly of FIG. 7 with the retractable body in an extended condition.
Figure 9:
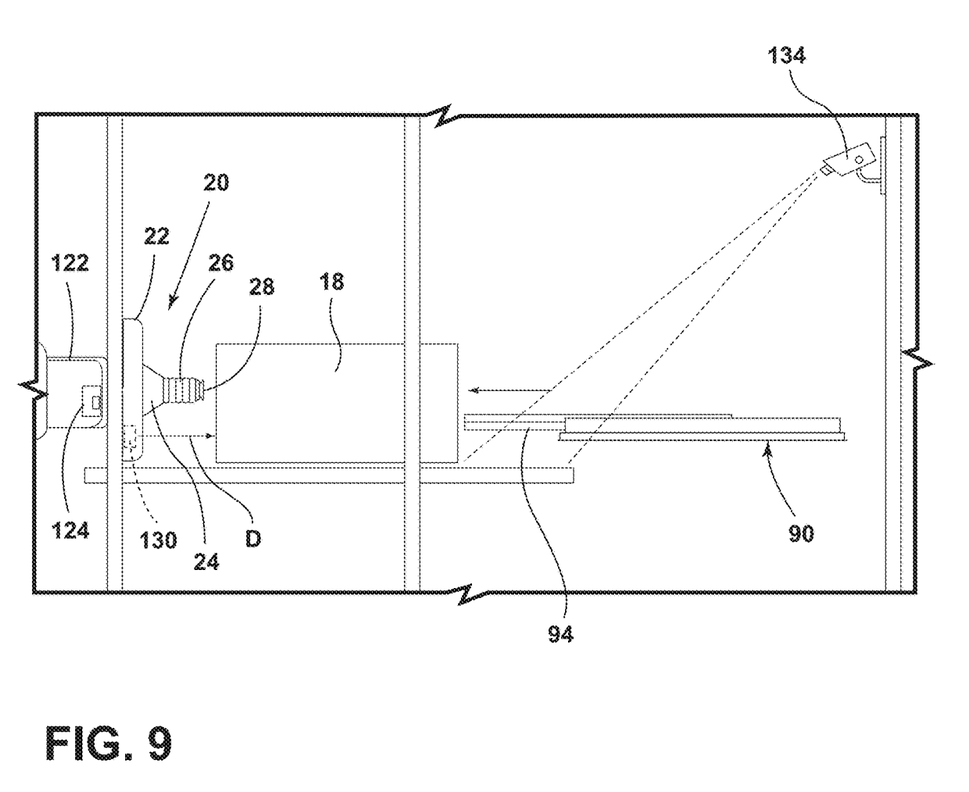
FIG. 9 is a partial side elevational view of a cargo space of a delivery vehicle with a delivery item being adjusted on a shelf via a lift assembly of the present disclosure.
Figure 10:
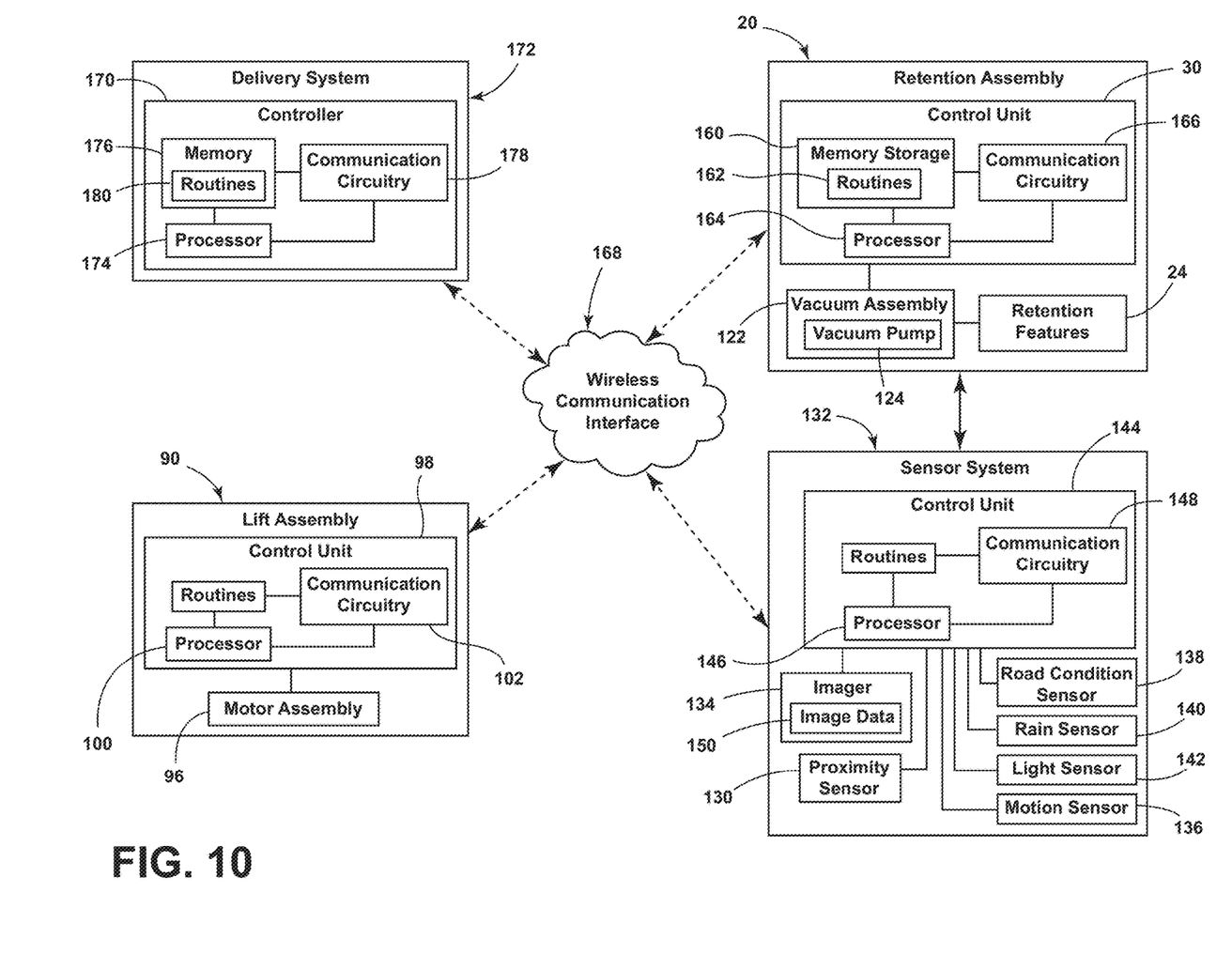
FIG. 10 is a schematic block diagram of a delivery system of the present disclosure.
Figure 11:
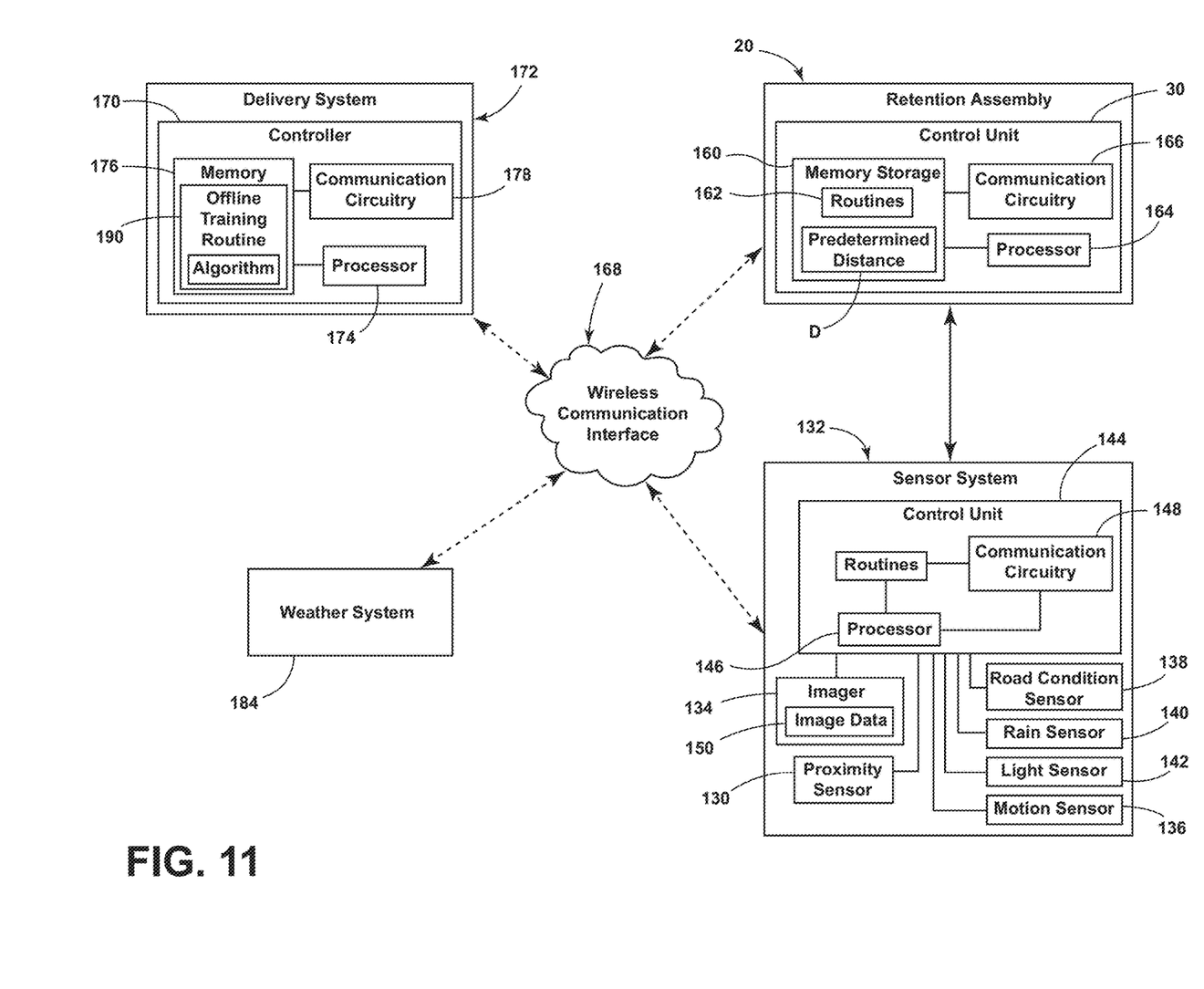
FIG. 11 is a schematic block diagram of a delivery system of the present disclosure.

The delivery items 18, 72 may shift or otherwise be altered relative to the shelving units 16 during transit when the retention assembly 20 is deactivated. As illustrated in FIG. 7, the delivery item 18 is positioned on the shelf 64 away from the sidewalls 12 and the retention assembly 20. The imager 134 may detect the position of the delivery item 18 and may send the corresponding image data 150 to the controller 170. It is also contemplated that the proximity sensor 130 may detect the movement of the delivery item 18 away from the sidewalls 12 and the retention assembly 20 and may communicate the detected position of the delivery item 18 to the control unit 30. The controller 170 and the control unit 30 may cooperate to reposition and adjust the delivery item 18 relative to the retention assembly 20 and the shelf 64.

The controller 170 may activate the lift assembly 90 to translate the central receiving member 94 toward the delivery item 18 to reposition the delivery item 18, toward the sidewalls 12 of the delivery vehicle 10. The proximity sensor 130 may detect the repositioning of the delivery item 18 and may communicate the position of the delivery item 18 with the control unit 30. The control unit 30 may activate the retractable body 26 of the retention feature 24 and the vacuum assembly 122 to further reposition and retain the delivery item 18. The control unit 30 may activate the retractable body 26 from the retracted condition to the extended condition and may activate the vacuum pump 124 to define the at least partial vacuum at the aperture 120 of the attachment portion 28. The lift assembly 90 and the retention assembly 20 cooperate to reposition the delivery item 18 along the shelf 64, and the retention assembly 20 retains the delivery item 18 proximate to the sidewalls 12 of the delivery vehicle 10. The vacuum assembly 122 can be selectively activated and deactivated depending on the routine 162 of the retention assembly 20. For example, the vacuum assembly 122 may be activated based on predicted and/or detected motion of the delivery items 18, 72. The predicted motion may be configured and learned as part of one of the routines 162 of the control unit 30 of the retention assembly 20. It is generally contemplated that the predicted motion may be learned via, at least, an offline training routine 190 of the delivery system 172.

Referring still to FIGS. 1-11 and in operation, the controller 170 of the delivery system 172 can be configured with the offline training routine 190 that may assist in predicting the movement of the delivery vehicle 10 and/or the delivery items 18, 72 during operation. The offline training routine 190 may include an algorithm, such as machine learning, artificial intelligence, reinforcement learning, and/or optimization. The offline training routine 190 is configured as a driving simulation to replicate dynamic driving environments. The controller 170 communicates with the control unit 30 of the retention assembly 20 via the wireless communication interface 168 to update the routines 162 of the retention assembly 20. The offline training routine 190 assists in maintaining the operation of the retention assembly 20 and the overall delivery system 172 over time and assists in increasing the overall efficiency of the delivery system 172.

With further reference to FIGS. 1-11, the delivery system 172 optimizes the control of the delivery items 18, 72 within the cargo space 14 via the retention assembly 20 and maximizes the efficiency of the delivery process via the sensor system 132 and the lift assembly 90. The sensor system 132 cooperates to detect the relative positioning of the delivery items 18, 72 within the cargo space 14, while the controller 170 may receive the delivery data, such as the weather data and/or road data. The controller 170 may communicate with the control unit 30 of the retention assembly 20 to activate the vacuum assembly 122 based on the delivery data received by the controller 170. The proximity sensor 130 and/or the imager 134 may assist in detecting movement of the delivery items 18, 72 relative the shelf 64, and the lift assembly 90 may cooperate with the retention assembly 20 and the controller 170 to adjust the position of potentially shifted delivery items 18, 72.

The delivery system 172 advantageously assists in the maintenance of the delivery items 18, 72 during transit. The retention of the delivery items 18, 72 may minimize the potential for movement of the delivery items 18, 72 within the cargo space 14. The lessened movement of the delivery items 18, 72 assists in the overall maintenance of the delivery items 18, 72 and may prevent movement within the cargo space 14. Further, the offline training routine 190 advantageously assists in updating and improving the operation of the delivery system 172 by updating the routines 162 of the retention assembly 20 based on simulated delivery scenarios.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A delivery vehicle, comprising:
    sidewalls within a cargo space;
    shelving units operably coupled to the sidewalls and configured to receive a delivery item; and
    a retention assembly coupled to the sidewalls proximate to the shelving units, the retention assembly including:
    a housing coupled to the sidewalls;
    a retention feature operably coupled to the housing, the retention feature including a retractable body and an attachment portion, wherein the retention assembly includes a vacuum assembly disposed within the housing and operably coupled to the retention feature; and
a control unit communicatively coupled to the retention assembly and configured to activate the retention assembly.

2. The delivery vehicle of claim 1, wherein the vacuum assembly is communicatively coupled with the control unit, and wherein the control unit is configured to activate the vacuum assembly to retain adjacent delivery items relative to the delivery item disposed on at least one of the shelving units.

3. The delivery vehicle of claim 2, wherein the retention assembly includes a sensor proximate the retention feature, and wherein the sensor is configured to detect a position of the delivery item.

4. The delivery vehicle of claim 3, wherein the control unit is configured to receive a signal from the sensor, and wherein the control unit is configured to activate the retractable body and the vacuum assembly upon receiving the signal from the sensor.

5. A delivery vehicle, comprising:
sidewalls within a cargo space;
shelving units operably coupled to the sidewalls and configured to receive a delivery item; and
a retention assembly coupled to receive sidewalls proximate to the shelving units, the retention assembly including:
a housing coupled to the sidewalls;
a retention feature operably coupled to the housing, the retention feature including a retractable body and an attachment portion; and
a control unit communicatively coupled to the retention assembly and configured to activate the retention assembly;
a lift assembly operably coupled to the shelving units and including a control unit, wherein the control unit of the lift assembly is communicatively coupled to the control unit of the retention assembly via a wireless communication interface.

6. The delivery vehicle of claim 5, wherein the control unit of the lift assembly is configured to activate the lift assembly to retrieve the delivery item, and wherein the control unit of the retention assembly is configured to activate the retention assembly to retain adjacent delivery items on the shelving units.

7. A delivery system for delivery items, comprising:
sidewalls defining a cargo space;
a retention assembly operably coupled to the sidewalls, the retention assembly including:
a housing;
a retention feature operably coupled to the housing, the retention feature having an attachment portion; and
a control unit operably coupled with the retention feature;
a controller communicatively coupled to the control unit of the retention assembly; and
a memory storage communicatively coupled with the controller, wherein the memory storage is configured with an offline training routine.

8. The delivery system of claim 7, further comprising:
a sensor system proximate the retention assembly and communicatively coupled with the controller.

9. The delivery system of claim 8, wherein the sensor system includes at least one of a proximity sensor and an imager, and wherein the sensor system is configured to detect a position of a delivery item and is configured to communicate with the controller the detected position.

10. The delivery system of claim 9, wherein the control unit of the retention assembly is configured to activate the retention assembly based on the detected position received from the sensor system.

11. The delivery system of claim 7, wherein the controller is configured to receive delivery data from a wireless communication interface, and wherein the delivery data includes at least one of weather data and road data.

12. The delivery system of claim 7, further comprising:
a lift assembly operably coupled to the controller and cooperatively operable with the retention assembly.

13. The delivery system of claim 7, wherein the retention assembly further includes a vacuum assembly operably coupled to the retention feature and communicatively coupled with the control unit to selectively define an at least partial vacuum at the attachment portion of the retention feature.

* * * * *

UNITED STATES PATENT AND TRADEMARK OFFICE
CERTIFICATE OF CORRECTION

| | |
|---|---|
| PATENT NO. | : 11,897,546 B2 |
| APPLICATION NO. | : 17/484075 |
| DATED | : February 13, 2024 |
| INVENTOR(S) | : Hong et al. |

Page 1 of 1

It is certified that error appears in the above-identified patent and that said Letters Patent is hereby corrected as shown below:

In the Claims

Column 13:
Claim 5, Line 25;
"receive" should be -- the --.

Signed and Sealed this
Ninth Day of April, 2024

Katherine Kelly Vidal
*Director of the United States Patent and Trademark Office*